(12) United States Patent
DeStories et al.

(10) Patent No.: US 12,544,909 B2
(45) Date of Patent: Feb. 10, 2026

(54) METHODS AND APPARATUS FOR CONTROLLED MATERIAL APPLICATION

(71) Applicant: The Boeing Company, Arlington, VA (US)

(72) Inventors: Jason G. DeStories, Broomfield, CO (US); Michael R. Mercer, Mesa, AZ (US); Basilio Penuelas, Mesa, AZ (US); Ashley B. Bruno, Mesa, AZ (US); Blaze Mitanoski, Mesa, AZ (US); Jared C. Tompkinson, Mesa, AZ (US)

(73) Assignee: The Boeing Company, Arlington, VA (US)

( * ) Notice: Subject to any disclaimer, the term of this patent is extended or adjusted under 35 U.S.C. 154(b) by 294 days.

(21) Appl. No.: 18/357,709

(22) Filed: Jul. 24, 2023

(65) Prior Publication Data

US 2025/0033192 A1    Jan. 30, 2025

(51) Int. Cl.
*B25J 9/04* (2006.01)
*B25J 9/00* (2006.01)
*B25J 9/08* (2006.01)

(52) U.S. Cl.
CPC ............. *B25J 9/042* (2013.01); *B25J 9/0084* (2013.01)

(58) Field of Classification Search
CPC ............................... B25J 9/042; B25J 9/0084
USPC ......................................................... 700/245
See application file for complete search history.

(56) References Cited

U.S. PATENT DOCUMENTS

| | | | | |
|---|---|---|---|---|
| 10,304,455 | B1 * | 5/2019 | Ulaganathan | G06F 16/90332 |
| 2016/0152068 | A1 * | 6/2016 | Zamarripa | B65D 25/16 220/570 |
| 2021/0180351 | A1 * | 6/2021 | Lau | B25J 9/0084 |
| 2022/0203756 | A1 * | 6/2022 | Logan | B44D 3/128 |
| 2023/0059095 | A1 * | 2/2023 | Tanaami | B25J 9/1633 |
| 2023/0382155 | A1 * | 11/2023 | Sassani | B44D 3/126 |

* cited by examiner

*Primary Examiner* — Kira Nguyen
(74) *Attorney, Agent, or Firm* — Hanley, Flight & Zimmerman, LLC

(57) ABSTRACT

Systems, apparatus, articles of manufacture, and methods are disclosed for controlled material application. An example apparatus includes a pool to carry the application material, a thinning sheet, a roller mounted on an electronically controlled robot arm, machine readable instructions, and controller circuitry to at least one of execute or instantiate the machine readable instructions to direct the electronically controlled robot arm to maneuver the roller to contact the application material in the pool, at least partially submerge the roller in the application material, maneuver the roller to contact the thinning sheet to distribute the application material to surround the roller, and apply the application material to the component by moving the roller across at least a portion of the component.

20 Claims, 9 Drawing Sheets

METHODS AND APPARATUS FOR CONTROLLED MATERIAL APPLICATION

FIELD OF THE DISCLOSURE

This disclosure relates generally to manufacturing systems and, more particularly, to methods and apparatus for controlled material application.

BACKGROUND

Assembly or manufacturing of various aircraft components may include application of adhesives. Manual application of these adhesives may be needed for smaller, more complex components.

SUMMARY

A disclosed example apparatus includes a pool to carry the application material, a thinning sheet, a roller mounted on an electronically controlled robot arm, machine readable instructions, and controller circuitry to at least one of execute or instantiate the machine readable instructions to direct the electronically controlled robot arm to maneuver the roller to contact the application material in the pool, at least partially submerge the roller in the application material, maneuver the roller to contact the thinning sheet to distribute the application material to surround the roller, and apply the application material to the component by moving the roller across at least a portion of the component.

A disclosed example non-transitory machine readable storage medium includes instructions to cause programmable circuitry to at least cause an end effector of a robotically controlled arm to contact application material, the application material to adhere to at least a portion of the end effector, direct the robotically controlled arm to maneuver the end effector to roll on a thinning sheet, the thinning sheet enabling the end effector to spread the application material, and cause the end effector to contact at least a portion of a workpiece for distribution of the application material thereon.

A disclosed example method includes causing a roller mounted to a robotic arm to contact a pool having application material disposed therein, the roller to retain at least a portion of the application material, maneuvering the roller from the pool to a thinning sheet, maneuvering the roller to contact the thinning sheet to distribute the application material around the roller, and causing the robotic arm to maneuver the roller to contact a workpiece, the roller distributing the application material to a portion of the workpiece.

Figure 1:
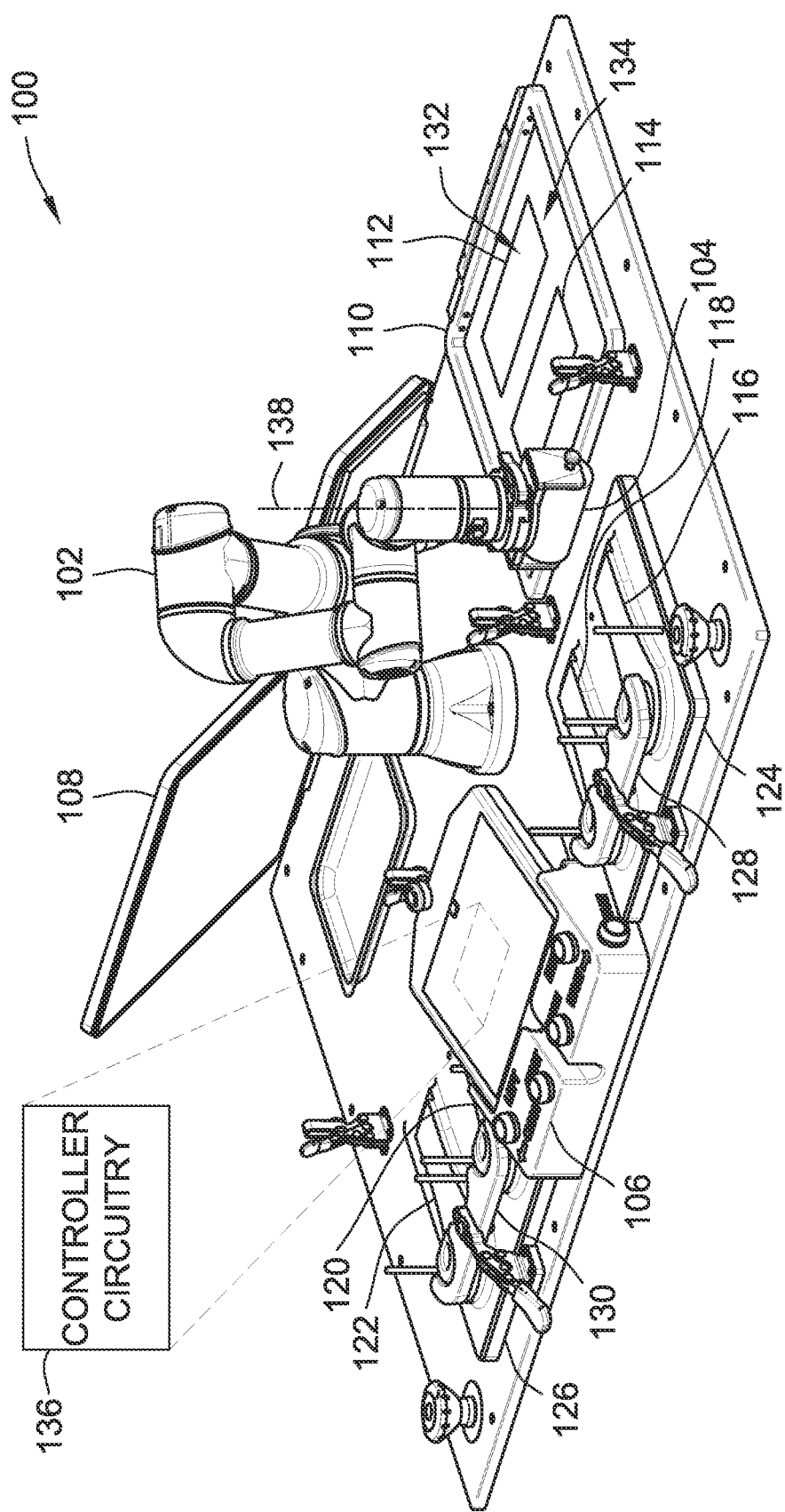
FIGS. 1, 2A, and 2B illustrate an example workstation constructed in accordance with teachings disclosed herein.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Methods and apparatus for controlled material application are disclosed. Industrial robots, or automated arms, may be utilized for industrial assembly or manufacturing operations. Alternatively, collaboration robots or cobots are machines intended to physically interact with humans in a shared workspace. In some instances, a cobot is programmed or otherwise configured to operate autonomously or with limited guidance. These cobots may be used to execute a workflow including one or more assembly operations or tasks at one or more assembly positions. Some known cobots perform such tasks based on pre-generated sequencing instructions. For example, such instructions may cause the cobot (e.g., robotic arm, end effector, etc.) to maneuver through different poses, positions, rotations, or orientations to perform tasks. In some examples, such instructions may include waypoints that define a route or map for the cobot to follow.

Examples disclosed herein include an example cobot to apply application material to an example component (e.g., a workpiece, an aircraft part, etc.). As used herein, the term "application material" can refer to adhesives (e.g., epoxy), bonding materials, cleaning materials, coating materials, etc. In some disclosed examples, the cobot is programmed with sequencing instructions to perform highly repetitive, dexterous tasks associated with material application methods. For example, the cobot can maneuver a roller to contact a pool of application material to gather a desired amount of the application material. Further, the example cobot disclosed herein can maneuver the roller to contact a thinning sheet to distribute the application material on the roller. As such, examples disclosed herein provide relatively uniform and improved consistency in material application. Examples disclosed herein also improve the ergonomics of labor intensive, manual material application processes. Further, examples disclosed herein enable operation and coordination between an example cobot and a human operator.

Figure 2A:
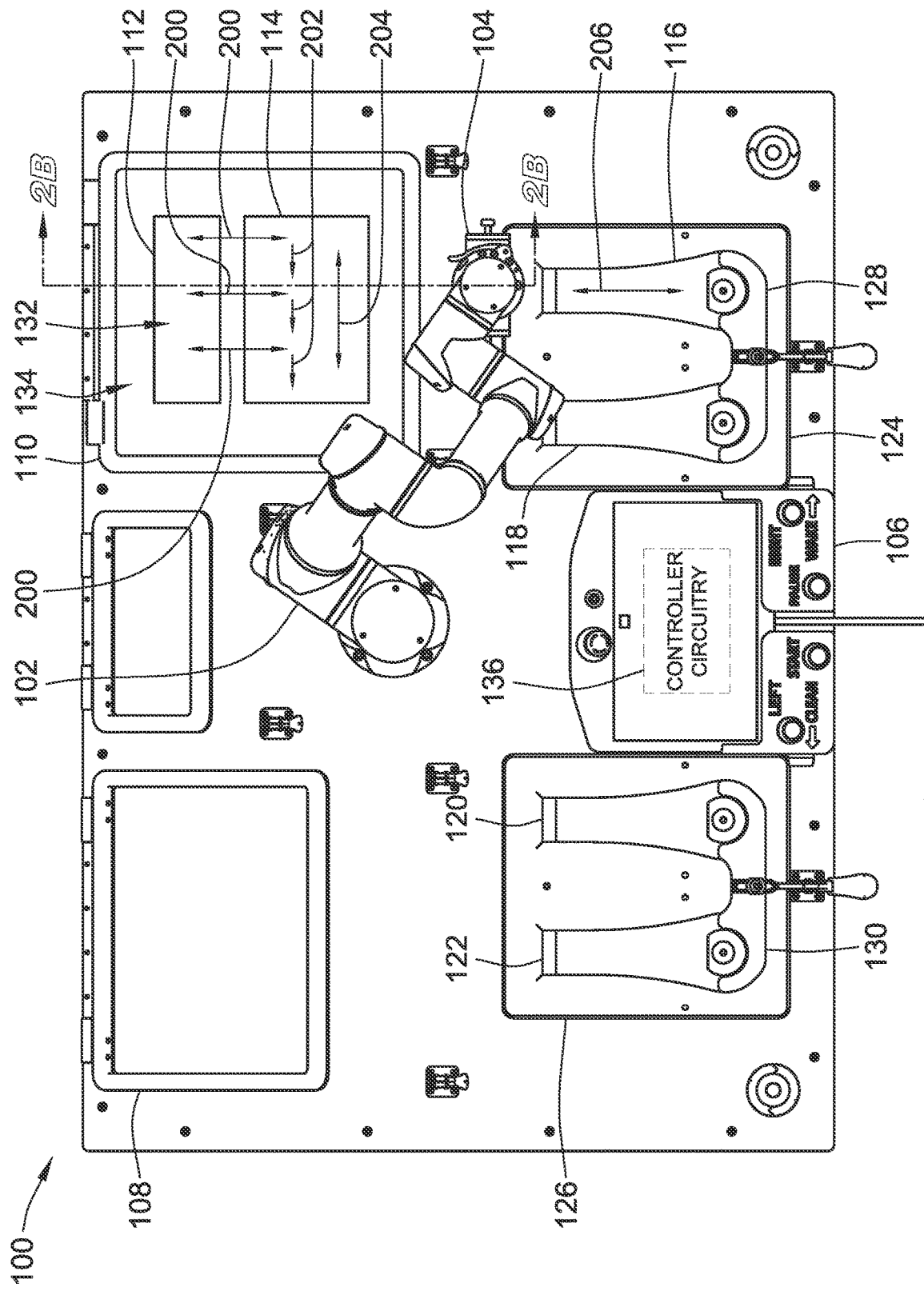
Figure 2B:
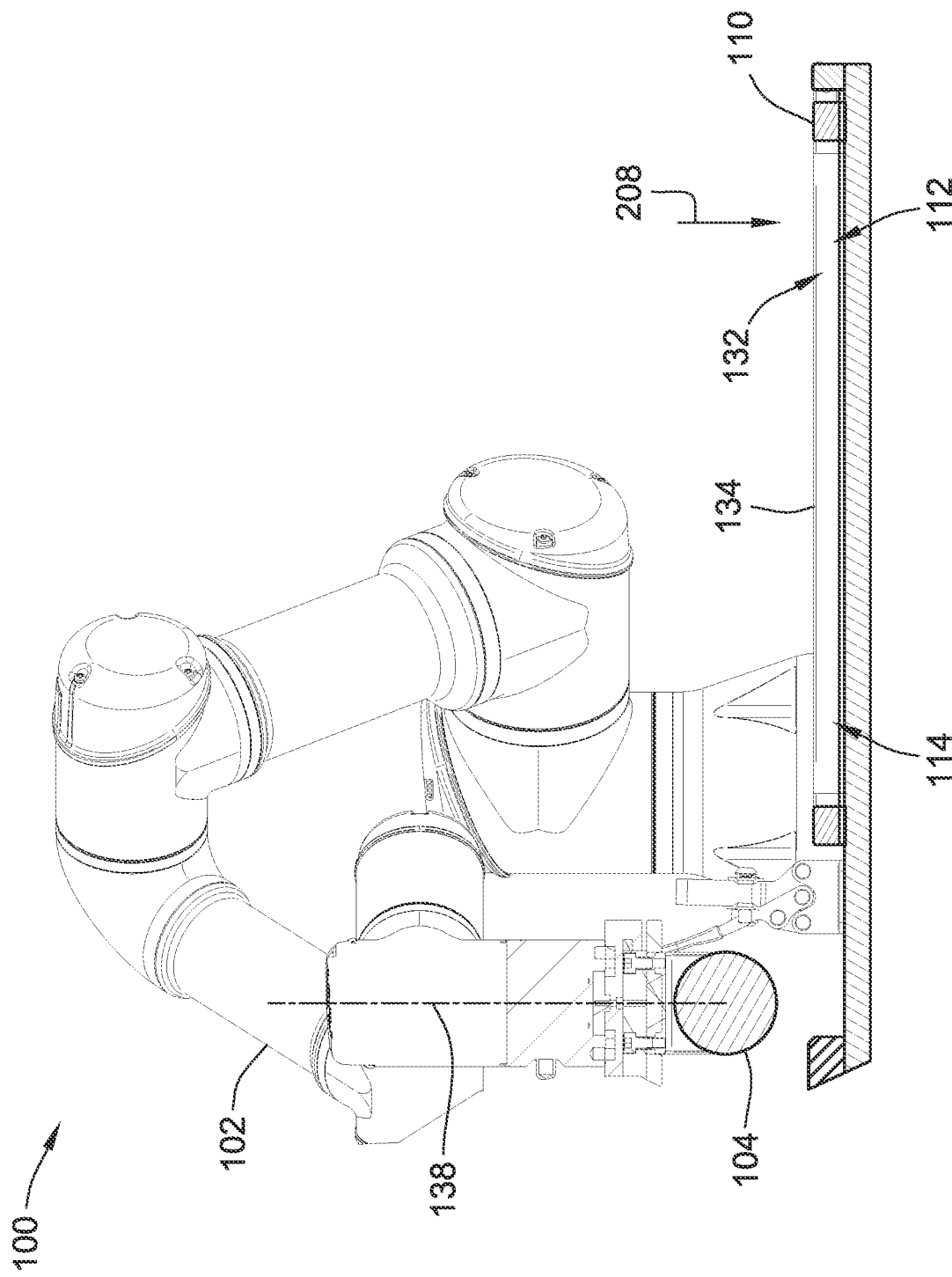

FIGS. 1, 2A, and 2B illustrate an example workstation 100 in accordance with teachings of this disclosure. The example workstation 100 includes an example robotic arm 102, an example roller 104, an example control device 106, example frames 108, 110, an example pool 112, an example thinning sheet 114, example components 116, 118, 120, 122, and example component fixtures 124, 126. Further, the example fixtures 124, 126 include clamps 128, 130 for securing the components 116, 118, 120, 122 thereon. The example pool 112 includes example application material 132 disposed therein. Additionally, the frame 110 supports an example porous sheet 134 that covers the pool 112, the application material 132, and the thinning sheet 114. In FIGS. 1, 2A, and 2B, the example components 116, 118, 120, 122 are plastic liners for connecting a blade to a rotor of a rotorcraft. However, the components 116, 118, 120, 122 can represent any aircraft component, rotorcraft component, or any other component.

The example robotic arm 102 is an electrically controlled robot arm that executes instructions to navigate the workstation 100. In some examples, the robotic arm 102 executes instructions that are programmed at the control device 106. However, a device external to the workstation 100, such as a desktop computer, can also program the robotic arm 102 with instructions. The example control device 106 can provide an operator interface for manually inputting instructions. In this example, the control device 106 includes example controller circuitry 136 to direct (e.g., control, manipulate, maneuver, etc.) the example robotic arm 102 around the workstation 100. Further, the example controller circuitry 136 can maneuver the roller 104 (e.g., end effector) disposed (e.g., mounted) at a distal end of the robotic arm 102. The example roller 104 is rotatable about an example axis of rotation 138. In this example, the axis of rotation 138 is aligned to a longitudinal axis of the robotic arm 102.

The example controller circuitry 136 causes the robotic arm 102 to maneuver the roller 104 according to a workflow sequence. Turning to FIG. 2A, an example workflow sequence is illustrated by example arrows 200, 202, 204, 206. The example workflow sequence begins when the example controller circuitry 136 causes the robotic arm 102 to maneuver the roller 104 to contact the application material 132. In some examples, the roller 104 can be at least partially submerged in the application material 132. As such, the example roller 104 may retain at least a portion of the application material 132. The example controller circuitry 136 then causes the robotic arm 102 to maneuver or roll the roller 104 from the pool 112 to the thinning sheet 114 in a direction (e.g., a back and forth motion) defined by the arrow(s) 200. Next, the example controller circuitry 136 causes the robotic arm 102 to maneuver or slide the roller 104 across the thinning sheet 114 in a direction defined by the arrow(s) 202 (transverse or sideways from the direction of arrows 200). In some examples, the controller circuitry 136 causes the robotic arm 102 to rotate the roller 104 to a first rotational position when the roller 104 contacts the pool 112. In some examples, the controller circuitry 136 causes the robotic arm 102 to repeat these movements a second or third time across the pool 112.

Then, the example controller circuitry 136 causes the robotic arm 102 to maneuver the roller 104 to contact the thinning sheet 114. In FIG. 2A, the example controller circuitry 136 can maneuver the roller 104 across the thinning sheet 114 in a direction defined by the arrows 204 to distribute or spread the application material 132 to surround the roller 104 (e.g., an outer surface of the roller 104). Further, the example controller circuitry 136 can rotate the roller 104 to a second rotational orientation when the roller 104 rolls across the thinning sheet 114, wherein the second rotational orientation is different from the first rotational orientation. In some examples, the controller circuitry 136 causes the roller 104 to repeat this movement (e.g., back and forth motion) multiple times (e.g., twice, thrice, etc.).

Finally, the example controller circuitry 136 causes the roller 104 to contact at least a portion of the component 116 for distribution or application of the application material 132 thereon. The example controller circuitry 136 causes the roller 104 to roll on at least a portion of the component 116 in a direction defined by the arrows 206. In some examples, the controller circuitry 136 causes the roller 104 to repeat this movement (e.g., rolling or stroking motion) multiple times. In some examples, the controller circuitry 136 can direct the robotic arm 102 to repeat this example workflow sequence to apply the application material 132 to the components 118, 120, 122. In some examples, the example controller circuitry 136 can direct the robotic arm 102 to vary an amount of application material 132 provided to the roller 104 based on the amount of residual application material 132 present on the roller 104. For example, the roller 104 may retain a certain amount of the application material 132 after depositing the application material 132 on the component 116. Accordingly, the example controller circuitry 136 can direct the robotic arm 102 to retrieve incrementally less of the application material 132 from the pool 112 to deposit on the component 118 based on the residual application material 132 retained by the roller 104. The application material 132 applied to any one of the components 116, 118, 120, 122 can weigh in a range from 0.02 grams (g) to 0.06 g. However, other weight ranges of the application material 132 can be used to suit the needs of a particular application. Additionally, the application material 132 applied to any one of the components 116, 118, 120, 122 can resist a force (e.g., separation force, peel force, etc.) in a range from 0 ounces (oz) to 13 oz.

FIG. 2B illustrates an example cross-sectional view of the example workstation 100. The example controller circuitry 136 can cause the roller 104 to depress or contact the porous sheet 134 as the roller 104 maneuvers across the pool 112 and the thinning sheet 114. As such, the roller 104 can push on the porous sheet 134 to extract the application material 132 from the pool 112. In other words, the application material 132 may flow (e.g., extend) through the porous sheet 134 in response to the downward force exerted by the roller 104. This downward force is represented as example arrow 208 in FIG. 2B. In some examples, the force exerted by the roller 104 onto the application material 132 and/or the pool 112 is Power Force Limiting (PFL). As such, the example controller circuitry 136 can control the magnitude of the downward force exerted by the roller 104 on the pool 112, the thinning sheet 114, the porous sheet 134, the components 116, 118, 120, 122, etc. In some examples, the controller circuitry 136 can cause the roller 104 to depress the porous sheet 134 to enable contact between the thinning sheet 114 and the roller 104. In some examples, the application material 132 may be deposited (e.g., added, inserted, etc.) to the thinning sheet 114 via a syringe. In turn, the example controller circuitry 136 can cause the roller 104 to depress the porous sheet 134 to enable contact between the roller 104 and the application material 132 disposed in the thinning sheet 114.

In some examples, the controller circuitry 136 causes the robotic arm 102 to maneuver the roller 104 through a cleaning process. The example workstation 100 may include a scouring pad or other abrasive material to clean the roller 104. In some examples, excess application material 132 may adhere to the roller 104 as the robotic arm 102 executes the workflow sequence. The example cleaning process can remove this excess application material 132 to ensure that the roller 104 includes a clean, smooth outer surface for collecting and applying the application material 132. As such, the example roller 104 may be cleaned for re-use between applications of the application material 132 to each of the components 116, 118, 120, 122.

Figure 3:
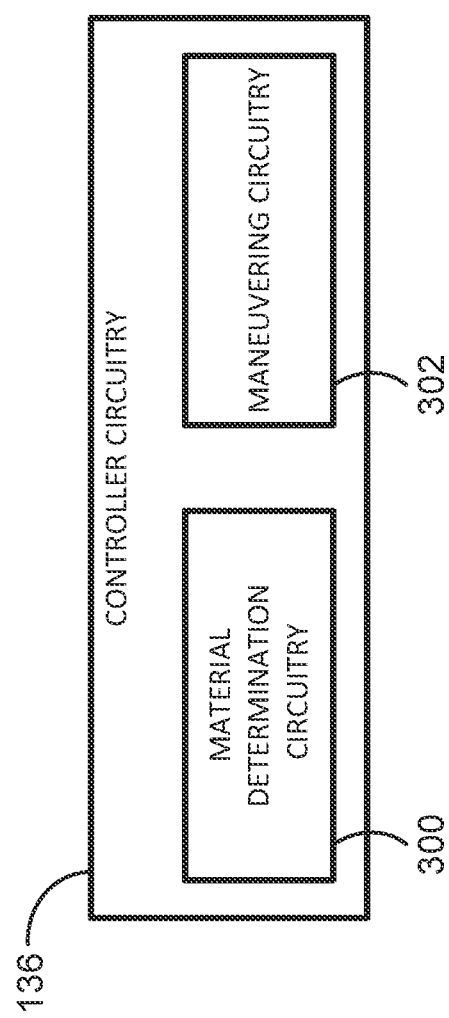
FIG. 3 is a block diagram of example controller circuitry in accordance with teachings of this disclosure.

FIG. 3 is a block diagram of an example implementation of the controller circuitry 136 of FIGS. 1, 2A, and 2B to control the robotic arm 102. The example controller circuitry 136 includes example material determination circuitry 300 and example maneuvering circuitry 302. The controller circuitry 136 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the controller circuitry 136 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The example material determination circuitry 300 determines an amount of the application material 132 for the roller 104 to retrieve. For example, the material determination circuitry 300 can determine that the roller 104 should retrieve 0.04 g of the application material 132 to dispose on the component 116. Accordingly, the example material determination circuitry 300 can determine a first amount of time (or a first number of strokes) for the roller 104 to traverse the pool 112 and a second amount of time (or a second number of strokes) for the roller 104 to traverse the thinning sheet 114 to achieve the desired amount of application material 132 (e.g., 0.04 g). In some examples, the example material determination circuitry 300 is instantiated by programmable circuitry executing material determination instructions and/or configured to perform operations such as those represented by the flowchart of FIG. 4.

In some examples, the controller circuitry 136 includes means for determining. For example, the means for determining may be implemented by the material determination circuitry 300. In some examples, the material determination circuitry 300 may be instantiated by programmable circuitry such as the example programmable circuitry 512 of FIG. 5. For instance, the material determination circuitry 300 may be instantiated by the example microprocessor 600 of FIG. 6 executing machine readable instructions such as those implemented by at least block 402 in FIG. 4. In some examples, the material determination circuitry 300 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the material determination circuitry 300 may be instantiated by any other combination of hardware, software, and/or firmware. For example, the material determination circuitry 300 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example maneuvering circuitry 302 causes the robotic arm 102 to maneuver the roller 104. The example maneuvering circuitry 302 causes the robotic arm 102 to maneuver the roller 104 to contact the application material 132. In some examples, the maneuvering circuitry 302 causes the roller 104 to be at least partially submerged in the application material 132. The example maneuvering circuitry 302 causes the robotic arm 102 to maneuver or roll the roller 104 from the pool 112 to the thinning sheet 114. Further, the example maneuvering circuitry 302 causes the robotic arm 102 to maneuver or slide the roller 104 across the pool 112 and/or the thinning sheet 114. In some examples, the controller circuitry 136 causes the robotic arm 102 to rotate the roller 104 to a first rotational position when the roller 104 contacts the pool 112.

The example maneuvering circuitry 302 can rotate the roller 104 to a second rotational orientation when the roller 104 rolls across the thinning sheet 114, wherein the second rotational orientation is different than the first rotational orientation. The example maneuvering circuitry 302 can cause the roller 104 to depress the porous sheet 134 as the roller 104 maneuvers across the pool 112 or the thinning sheet 114. Further, the example maneuvering circuitry 302 causes the roller 104 to contact at least a portion of the component 116 for distribution or application of the application material 132 thereon. In some examples, the example maneuvering circuitry 302 is instantiated by programmable circuitry executing maneuvering instructions and/or configured to perform operations such as those represented by the flowchart of FIG. 4.

In some examples, the controller circuitry 136 includes means for maneuvering the robotic arm 102 and the roller 104. For example, the means for maneuvering may be implemented by the maneuvering circuitry 302. In some examples, the maneuvering circuitry 302 may be instantiated by programmable circuitry such as the example programmable circuitry 512 of FIG. 5. For instance, the maneuvering circuitry 302 may be instantiated by the example microprocessor 600 of FIG. 6 executing machine executable instructions such as those implemented by at least blocks 404, 406, 408, 410, and 412 of FIG. 4. In some examples, the maneuvering circuitry 302 may be instantiated by hardware logic circuitry, which may be implemented by an ASIC, XPU, or the FPGA circuitry 700 of FIG. 7 configured and/or structured to perform operation corresponding to the machine readable instructions. Additionally or alternatively, the maneuvering circuitry 302 may be instantiated by any other combination of hardware, software, and/or firmware. For example, the maneuvering circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the controller circuitry 136 of FIGS. 1, 2A, and 2B is illustrated in FIG. 3, one or more of the elements, processes, and/or devices illustrated in FIG. 3 may be combined, divided, re-arranged, omitted, eliminated, and/or implemented in any other way. Further, the material determination circuitry 300, the example maneuvering circuitry 302, and/or, more generally, the example controller circuitry 136 of FIG. 3, may be implemented by hardware alone or by hardware in combination with software and/or firmware. Thus, for example, any of the material determination circuitry 300, the example maneuvering circuitry 302, and/or, more generally, the example controller circuitry 136, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example controller circuitry 136 of FIG. 3 may include one or more elements, processes, and/or devices in addition to, or instead of, those illustrated in FIG. 3, and/or may include more than one of any or all of the illustrated elements, processes and devices.

Figure 4:
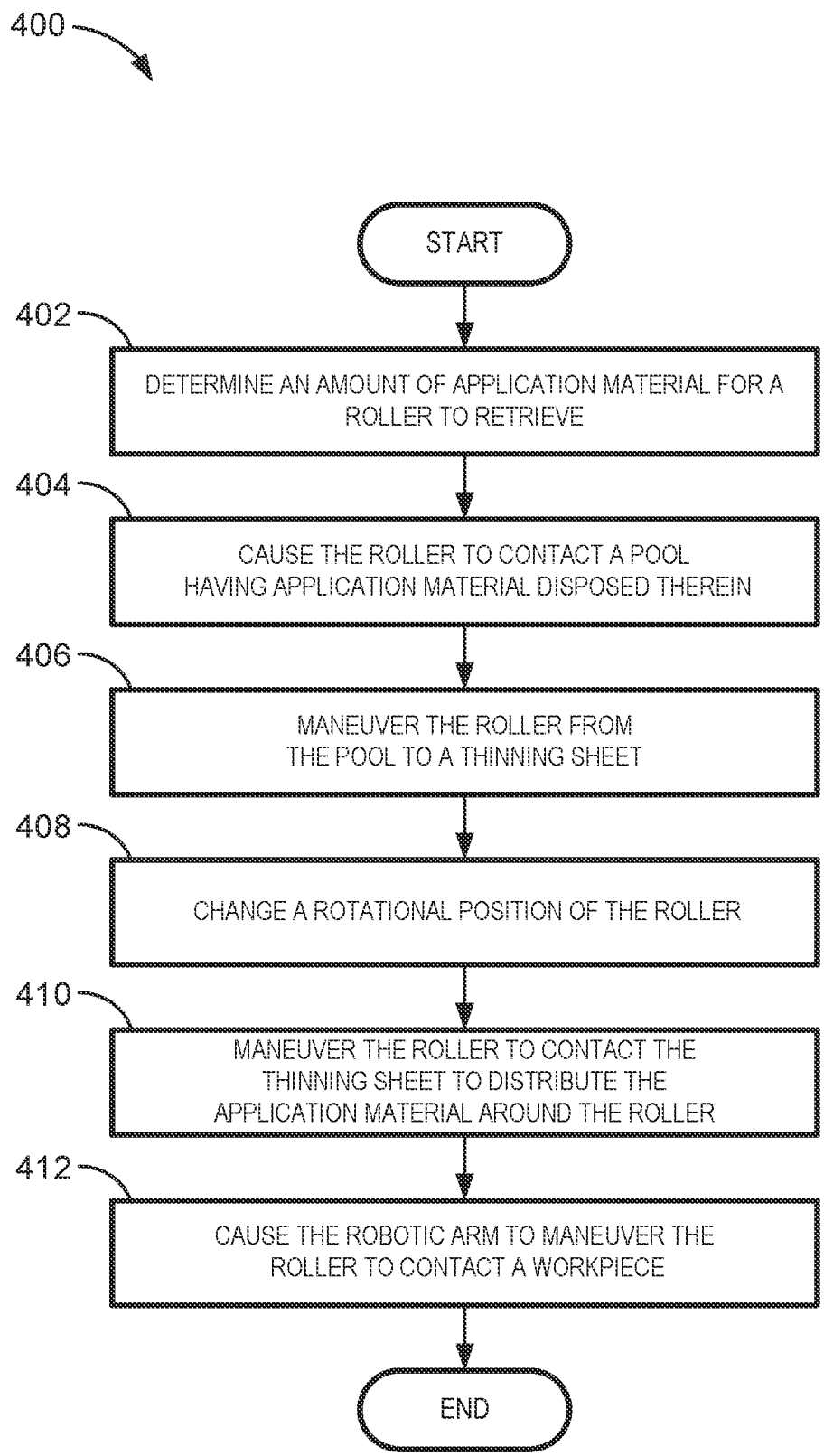
FIG. 4 is a flowchart representative of example machine readable instructions and/or example operations that may be executed, instantiated, and/or performed by example programmable circuitry to implement the example controller circuitry 136 of FIG. 3.

A flowchart representative of example machine readable instructions, which may be executed by programmable circuitry to implement and/or instantiate the controller circuitry 136 of FIG. 3 and/or representative of example operations which may be performed by programmable circuitry to implement and/or instantiate the controller circuitry 136 of FIG. 3, are shown in FIG. 4. The machine readable instructions may be one or more executable programs or portion(s) of one or more executable programs for execution by programmable circuitry such as the programmable circuitry 512 shown in the example programmable circuitry platform 500 discussed below in connection with FIG. 5 and/or may be one or more function(s) or portion(s) of functions to be performed by the example programmable circuitry (e.g., an FPGA) discussed below in connection with FIGS. 6 and/or 7. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flow-chart illustrated in FIG. 4, many other methods of implementing the example controller circuitry 136 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 4 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed, instantiated, and/or performed by programmable circuitry to control the robotic arm 102. The example machine-readable instructions and/or the example operations 400 of FIG. 4 begin at block 402, at which the example material determination circuitry 300 determines an amount of the application material 132 (e.g., 0.04 g) for the roller 104 to retrieve.

At block 404, the maneuvering circuitry 302 causes the roller 104 to contact the pool 112 and the application material 132 disposed therein. In some examples, the maneuvering circuitry 302 causes the roller 104 to be at least partially submerged in the application material 132. In some examples, the maneuvering circuitry 302 can cause the roller 104 to depress the porous sheet 134 as the roller 104 maneuvers across the pool 112.

At block 406, the example maneuvering circuitry 302 causes the robotic arm 102 to maneuver the roller 104 from the pool 112 to the thinning sheet 114. In some examples, the maneuvering circuitry 302 causes the robotic arm 102 to maneuver the roller 104 in a direction transverse to the direction defined by the arrow(s) 200.

At block 408, the example maneuvering circuitry 302 causes the robotic arm 102 to change a rotational position of the roller 104. For example, the maneuvering circuitry 302 may cause the robotic arm 102 to rotate the roller 104 to a first rotational position when the roller 104 maneuvers across the pool 112. Additionally or alternatively, the maneuvering circuitry 302 may cause the robotic arm 102 to rotate the roller 104 to a second rotational position when the roller 104 maneuvers across the thinning sheet 114. In other words, the maneuvering circuitry 302 can cause the robotic arm 102 to change a rotational position of the roller 104 after the maneuvering circuitry 302 maneuvers the roller 104 away from the pool 112.

At block 410, the example maneuvering circuitry 302 causes the robotic arm 102 to maneuver the roller 104 to contact the thinning sheet 114 to distribute the application material 132 around the roller 104. In some examples, the maneuvering circuitry 302 can cause the roller 104 to depress the porous sheet 134 to enable contact between the thinning sheet 114 and the roller 104.

At block 412, the example maneuvering circuitry 302 causes the roller 104 to contact at least a portion of the component 116 for distribution or application of the application material 132 thereon. The example controller circuitry 136 causes the roller 104 to roll on at least a portion of the component 116 in a direction defined by the arrows 206. Then, the process ends.

Figure 5:
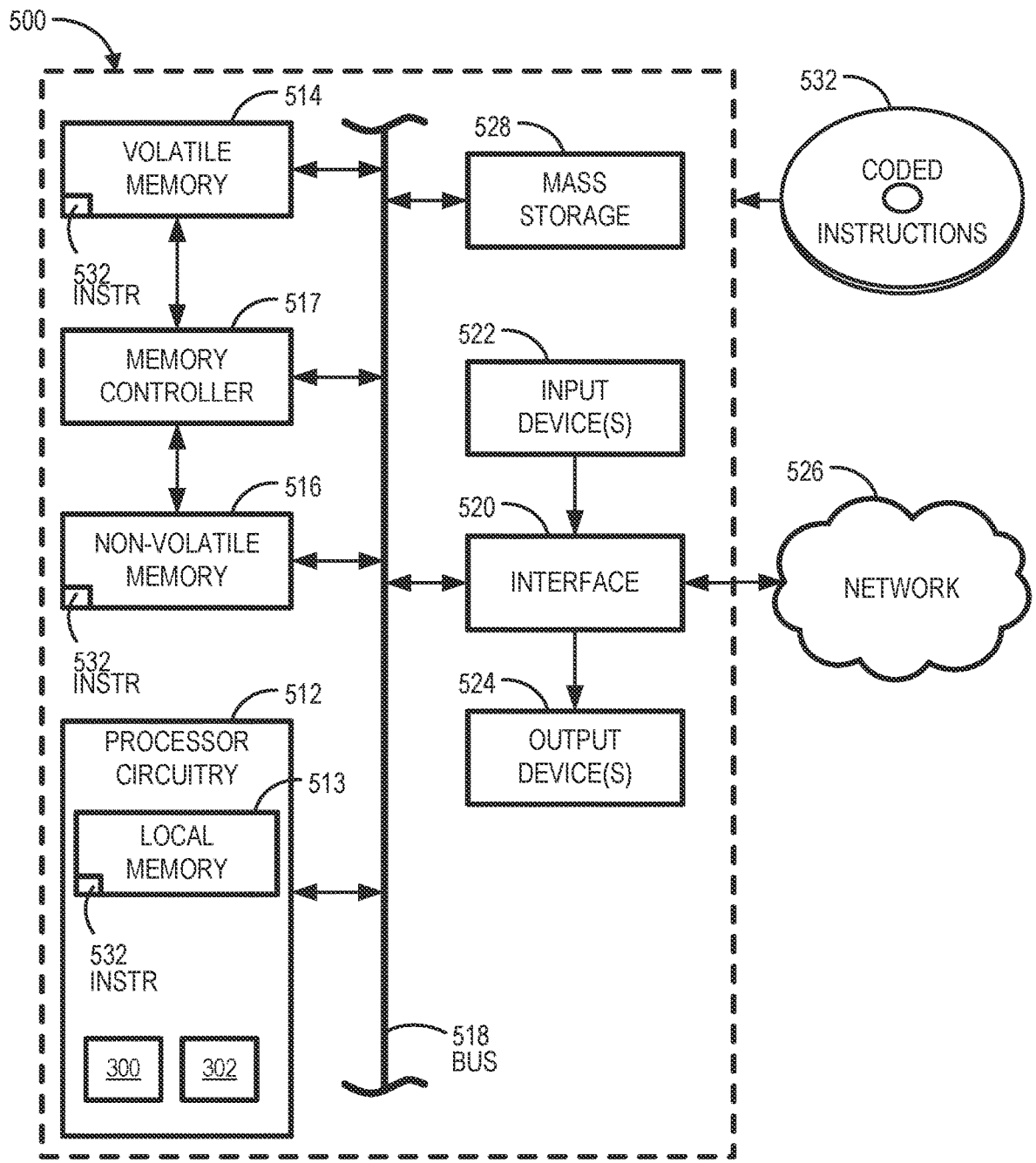
FIG. 5 is a block diagram of an example processing platform including programmable circuitry structured to execute, instantiate, and/or perform the example machine readable instructions and/or perform the example operations of FIG. 4 to implement the example controller circuitry 136 of FIG. 3.

FIG. 5 is a block diagram of an example programmable circuitry platform 500 structured to execute and/or instantiate the example machine-readable instructions and/or the example operations of FIG. 4 to implement the controller circuitry 136 of FIG. 3. The programmable circuitry platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing and/or electronic device.

The programmable circuitry platform 500 of the illustrated example includes programmable circuitry 512. The programmable circuitry 512 of the illustrated example is hardware. For example, the programmable circuitry 512 can be implemented by one or more integrated circuits, logic circuits, FPGAs, microprocessors, CPUs, GPUs, DSPs, and/or microcontrollers from any desired family or manufacturer. The programmable circuitry 512 may be implemented by one or more semiconductor based (e.g., silicon based) devices. In this example, the programmable circuitry 512 implements the example material determination circuitry 300 and the example maneuvering circuitry 302.

The programmable circuitry 512 of the illustrated example includes a local memory 513 (e.g., a cache, registers, etc.). The programmable circuitry 512 of the illustrated example is in communication with main memory 514, 516, which includes a volatile memory 514 and a non-volatile memory 516, by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517. In some examples, the memory controller 517 may be implemented by one or more integrated circuits, logic circuits, microcontrollers from any desired family or manufacturer, or any other type of circuitry to manage the flow of data going to and from the main memory 514, 516.

The programmable circuitry platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user (e.g., a human user, a machine user, etc.) to enter data and/or commands into the programmable circuitry 512. The input device(s) 522 can be implemented by, for example, an audio sensor, a microphone, a camera (still or video), a keyboard, a button, a mouse, a touchscreen, a trackpad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 500 of the illustrated example also includes one or more mass storage discs or devices 528 to store firmware, software, and/or data. Examples of such mass storage discs or devices 528 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 532, which may be implemented by the machine readable instructions of FIG. 4, may be stored in the mass storage device 528, in the volatile memory 514, in the non-volatile memory 516, and/or on at least one non-transitory computer readable storage medium such as a CD or DVD which may be removable.

Figure 6:
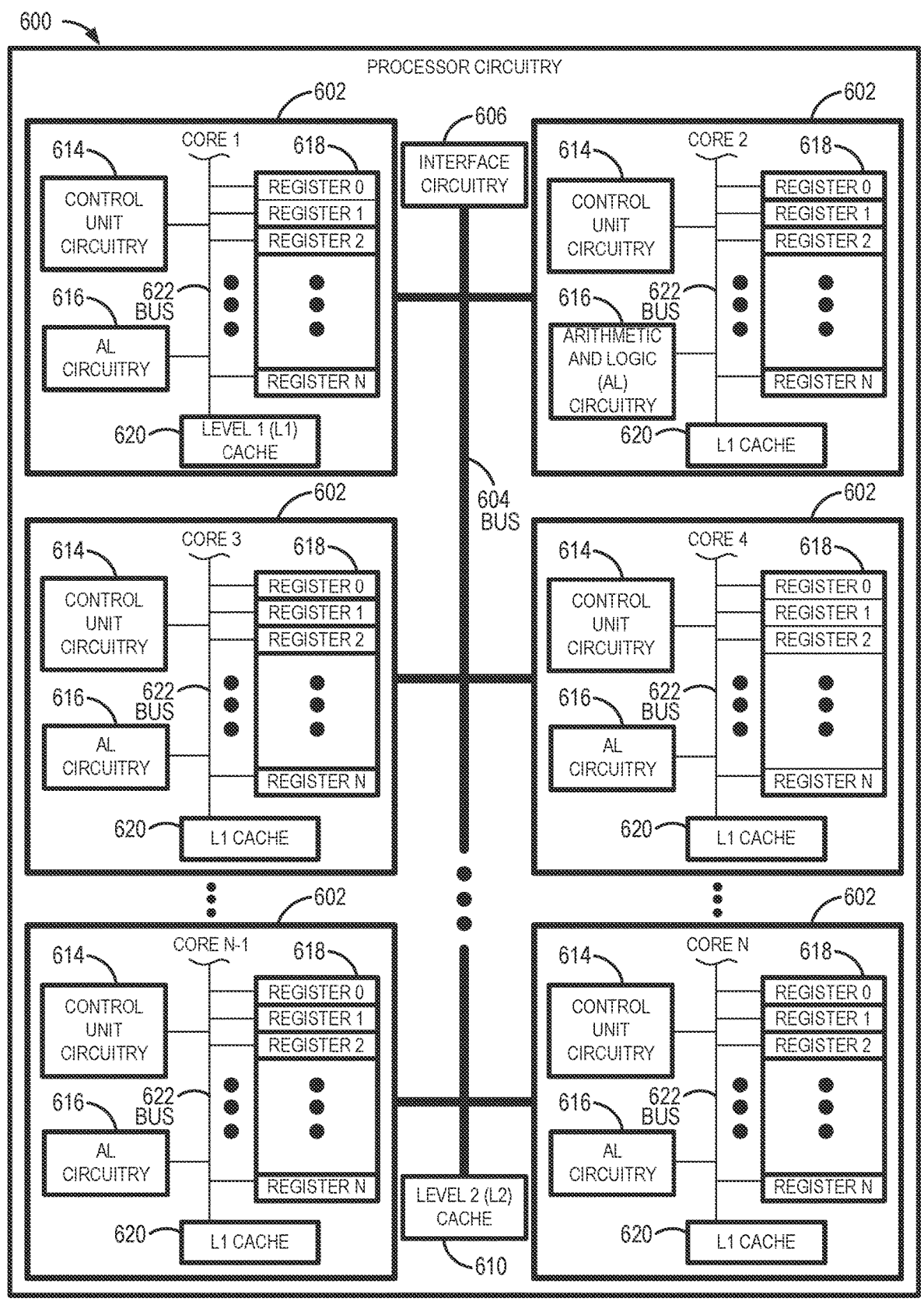
FIG. 6 is a block diagram of an example implementation of the programmable circuitry of FIG. 5.

FIG. 6 is a block diagram of an example implementation of the programmable circuitry 512 of FIG. 5. In this example, the programmable circuitry 512 of FIG. 5 is implemented by a microprocessor 600. For example, the microprocessor 600 may be a general-purpose microprocessor (e.g., general-purpose microprocessor circuitry). The microprocessor 600 executes some or all of the machine-readable instructions of the flowchart of FIG. 4 to effectively instantiate the circuitry of FIG. 2 as logic circuits to perform operations corresponding to those machine readable instructions. In some such examples, the circuitry of FIG. 3 is instantiated by the hardware circuits of the microprocessor 600 in combination with the machine-readable instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowchart of FIG. 4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating-point operations. In yet other examples, the AL circuitry 616 may include first AL circuitry that performs integer-based operations and second AL circuitry that performs floating-point operations. In some examples, the AL circuitry 616 may be referred to as an Arithmetic Logic Unit (ALU).

The registers 618 are semiconductor-based structures to store data and/or instructions such as results of one or more of the operations performed by the AL circuitry 616 of the corresponding core 602. For example, the registers 618 may include vector register(s), SIMD register(s), general-purpose register(s), flag register(s), segment register(s), machine-specific register(s), instruction pointer register(s), control register(s), debug register(s), memory management register (s), machine check register(s), etc. The registers 618 may be arranged in a bank as shown in FIG. 6. Alternatively, the registers 618 may be organized in any other arrangement, format, or structure, such as by being distributed throughout the core 602 to shorten access time. The second bus 622 may be implemented by at least one of an I2C bus, a SPI bus, a PCI bus, or a PCIe bus.

Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages.

The microprocessor 600 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 600, in the same chip package as the microprocessor 600 and/or in one or more separate packages from the microprocessor 600.

Figure 7:
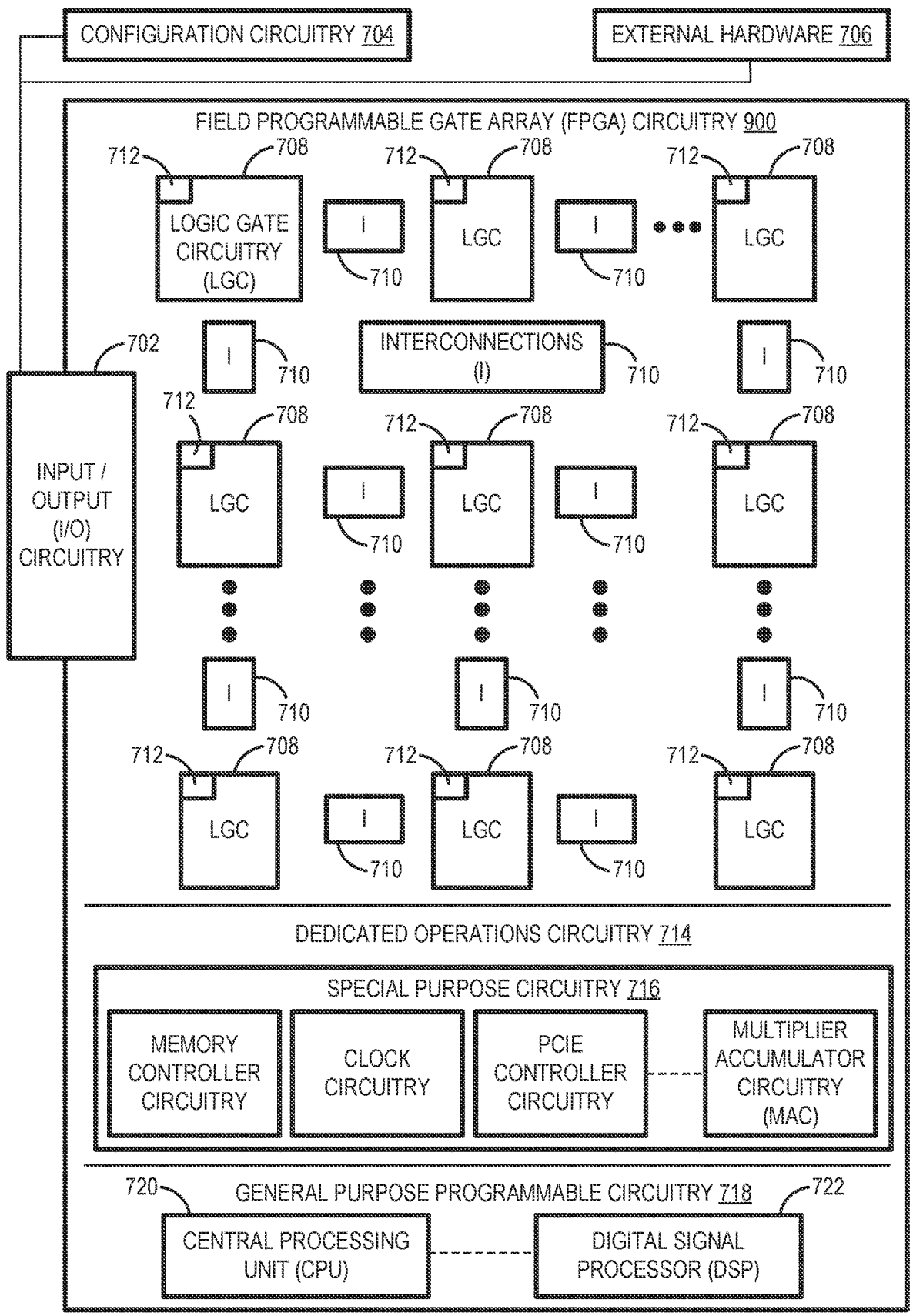
FIG. 7 is a block diagram of another example implementation of the programmable circuitry of FIG. 5.

FIG. 7 is a block diagram of another example implementation of the programmable circuitry 512 of FIG. 5. In this example, the programmable circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 600 of FIG. 6 described above (which is a general purpose device that may be programmed to execute some or all of the machine readable instructions represented by the flowchart of FIG. 4 but whose interconnections and logic circuitry are fixed once fabricated), the FPGA circuitry 700 of the example of FIG. 7 includes interconnections and logic circuitry that may be configured, structured, programmed, and/or interconnected in different ways after fabrication to instantiate, for example, some or all of the operations/functions corresponding to the machine readable instructions represented by the flowchart of FIG. 4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 4. As such, the FPGA circuitry 700 may be configured and/or structured to effectively instantiate some or all of the operations/functions corresponding to the machine readable instructions of the flowchart of FIG. 4 as dedicated logic circuits to perform the operations/functions corresponding to those software instructions in a dedicated manner analogous to an ASIC. Therefore, the FPGA circuitry 700 may perform the operations/functions corresponding to the some or all of the machine readable instructions of FIG. 4 faster than the general-purpose microprocessor can execute the same.

In the example of FIG. 7, the FPGA circuitry 700 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 700 of FIG. 7 may access and/or load the binary file to cause the FPGA circuitry 700 of FIG. 7 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 700 of FIG. 7 to cause configuration and/or structuring of the FPGA circuitry 700 of FIG. 7, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 700 of FIG. 7 may access and/or load the binary file to cause the FPGA circuitry 700 of FIG. 7 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 700 of FIG. 7 to cause configuration and/or structuring of the FPGA circuitry 700 of FIG. 7, or portion(s) thereof.

The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain a binary file, which may be implemented by a bit stream, data, and/or machine-readable instructions, to configure the FPGA circuitry 700, or portion(s) thereof. In some such examples, the configuration circuitry 704 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 706 may be implemented by external hardware circuitry. For example, the external hardware 706 may be implemented by the microprocessor 600 of FIG. 6.

The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations/functions that may correspond to at least some of the machine readable instructions of FIG. 4 and/or other desired operations. The logic gate circuitry 708 shown in FIG. 7 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations/functions. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example dedicated operations circuitry 714. In this example, the dedicated operations circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the programmable circuitry 512 of FIG. 5, many other approaches are contemplated. For example, FPGA circuitry may include an on-board CPU, such as one or more of the example CPU 720 of FIG. 6. Therefore, the programmable circuitry 512 of FIG. 5 may additionally be implemented by combining at least the example microprocessor 600 of FIG. 6 and the example FPGA circuitry 700 of FIG. 7. In some such hybrid examples, one or more cores 602 of FIG. 6 may execute a first portion of the machine readable instructions represented by the flowchart of FIG. 4 to perform first operation(s)/function(s), the FPGA circuitry 700 of FIG. 7 may be configured and/or structured to perform second operation(s)/function(s) corresponding to a second portion of the machine readable instructions represented by the flowchart of FIG. 4, and/or an ASIC may be configured and/or structured to perform third operation(s)/function(s) corresponding to a third portion of the machine readable instructions represented by the flowchart of FIG. 4.

It should be understood that some or all of the circuitry of FIG. 3 may, thus, be instantiated at the same or different times. For example, same and/or different portion(s) of the microprocessor 600 of FIG. 6 may be programmed to execute portion(s) of machine-readable instructions at the same and/or different times. In some examples, same and/or different portion(s) of the FPGA circuitry 700 of FIG. 7 may be configured and/or structured to perform operations/functions corresponding to portion(s) of machine-readable instructions at the same and/or different times.

In some examples, some or all of the circuitry of FIG. 3 may be instantiated, for example, in one or more threads executing concurrently and/or in series. For example, the microprocessor 600 of FIG. 6 may execute machine readable instructions in one or more threads executing concurrently and/or in series. In some examples, the FPGA circuitry 700 of FIG. 7 may be configured and/or structured to carry out operations/functions concurrently and/or in series. Moreover, in some examples, some or all of the circuitry of FIG. 3 may be implemented within one or more virtual machines and/or containers executing on the microprocessor 600 of FIG. 6.

In some examples, the programmable circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the programmable circuitry 512 of FIG. 5, which may be in one or more packages. For example, the XPU may include a CPU (e.g., the microprocessor 600 of FIG. 6, the CPU 720 of FIG. 7, etc.) in one package, a DSP (e.g., the DSP 722 of FIG. 7) in another package, a GPU in yet another package, and an FPGA (e.g., the FPGA circuitry 700 of FIG. 7) in still yet another package.

Figure 8:
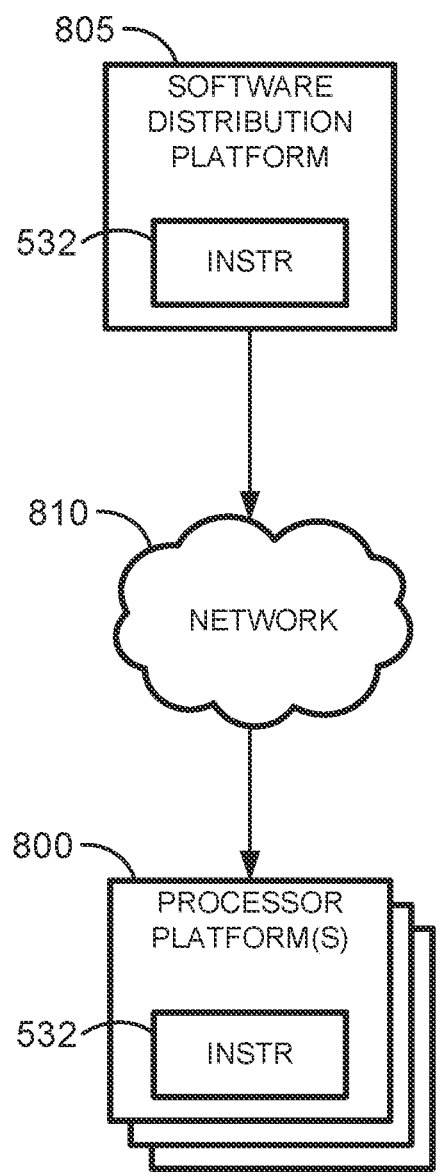
FIG. 8 is a block diagram of an example software/firmware/instructions distribution platform (e.g., one or more servers) to distribute software, instructions, and/or firmware (e.g., corresponding to the example machine readable instructions of FIG. 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to other hardware devices (e.g., hardware devices owned and/or operated by third parties from the owner and/or operator of the software distribution platform) is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions of FIG. 4, as described above. The one or more servers of the example software distribution platform 805 are in communication with an example network 810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions of FIG. 4, may be downloaded to the example programmable circuitry platform 500, which is to execute the machine readable instructions 532 to implement the example controller circuitry 136. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that perform highly repetitive, dexterous tasks associated with material application methods. Examples disclosed herein improve the ergonomics of labor intensive, manual material application processes. Further, examples disclosed herein enable operation and coordination between an example robot and a human operator.

Example 1 includes an apparatus for applying application material to a component, the apparatus comprising a pool to carry the application material, a thinning sheet, a roller mounted on an electronically controlled robot arm, machine readable instructions, and controller circuitry to at least one of execute or instantiate the machine readable instructions to direct the electronically controlled robot arm to maneuver the roller to contact the application material in the pool, at least partially submerge the roller in the application material, maneuver the roller to contact the thinning sheet to distribute the application material to surround the roller, and apply the application material to the component by moving the roller across at least a portion of the component.

Example 2 includes the apparatus of example 1, wherein the controller circuitry is to direct the electronically controlled robot arm to rotate the roller to a first rotational position when the roller contacts the pool and a second rotational position different from the first rotational position when the roller contacts the thinning sheet.

Example 3 includes the apparatus of example 1, further including a porous sheet to cover the pool and the thinning sheet, the porous sheet to enable the application material in the pool to flow through the porous sheet.

Example 4 includes the apparatus of example 3, wherein the controller circuitry is to direct the electronically controlled robot arm to push the roller on the porous sheet to extract the application material.

Example 5 includes the apparatus of example 3, wherein the controller circuitry is to direct the electronically controlled robot arm to maneuver the roller across the porous sheet from the pool to the thinning sheet.

Example 6 includes the apparatus of example 1, wherein the controller circuitry is to direct the electronically controlled robot arm to maneuver the roller in a first direction across the pool and a second direction across the thinning sheet, the second direction transverse to the first direction.

Example 7 includes the apparatus of example 6, wherein the roller rotates along the pool in the first direction.

Example 8 includes a non-transitory machine readable storage medium comprising instructions to cause programmable circuitry to at least cause an end effector of a robotically controlled arm to contact application material, the application material to adhere to at least a portion of the end effector, direct the robotically controlled arm to maneuver the end effector to roll on a thinning sheet, the thinning sheet enabling the end effector to spread the application material, and cause the end effector to contact at least a portion of a workpiece for distribution of the application material thereon.

Example 9 includes the non-transitory machine readable storage medium of example 8, wherein the programmable circuitry is to cause the end effector to contact the thinning sheet to distribute the application material to surround an outer surface of the end effector.

Example 10 includes the non-transitory machine readable storage medium of example 8, wherein the programmable circuitry is to cause the end effector to at least partially depress the thinning sheet to distribute the application material.

Example 11 includes the non-transitory machine readable storage medium of example 8, wherein the programmable circuitry is to cause the end effector to rotate about an axis of rotation, the axis of rotation aligned to a longitudinal axis of the robotically controlled arm.

Example 12 includes the non-transitory machine readable storage medium of example 8, wherein the programmable circuitry is to cause the end effector to at least partially depress a porous sheet to extract the application material from a pool carrying the application material, the porous sheet covering the pool, the application material to flow through the porous sheet.

Example 13 includes the non-transitory machine readable storage medium of example 12, wherein the programmable circuitry is to cause the end effector to rotate to a first rotational position when the end effector contacts the pool, and rotate to a second rotational position different from the first rotational position when the end effector contacts the thinning sheet.

Example 14 includes the non-transitory machine readable storage medium of example 12, wherein the programmable circuitry is to cause the end effector to roll across the porous sheet from the pool to the thinning sheet.

Example 15 includes a method comprising causing a roller mounted to a robotic arm to contact a pool having application material disposed therein, the roller to retain at least a portion of the application material, maneuvering the roller from the pool to a thinning sheet, maneuvering the roller to contact the thinning sheet to distribute the application material around the roller, and causing the robotic arm to maneuver the roller to contact a workpiece, the roller distributing the application material to a portion of the workpiece.

Example 16 includes the method of example 15, further including causing the robotic arm to maneuver the roller in a first direction across the pool, and causing the robotic arm to maneuver the roller in a second direction across the thinning sheet, the second direction transverse to the first direction.

Example 17 includes the method of example 15, further including causing the robotic arm to change a rotational position of the roller after the robotic arm maneuvers the roller away from the pool.

Example 18 includes the method of example 15, further including causing the robotic arm to push the roller on a porous sheet to extract the application material from the pool, the porous sheet covering the pool and the thinning sheet.

Example 19 includes the method of example 18, further including causing the roller to contact the porous sheet when the roller maneuvers from the pool to the thinning sheet.

Example 20 includes the method of example 18, further including causing the robotic arm to push the roller on the porous sheet to enable contact between the thinning sheet and the roller.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus for applying application material to a component, the apparatus comprising:
   a pool to carry the application material;
   a thinning sheet;
   a porous sheet to cover the pool and the thinning sheet, the porous sheet to enable the application material in the pool to flow through the porous sheet;
   a roller mounted on an electronically controlled robot arm;
   machine readable instructions; and
   controller circuitry to at least one of execute or instantiate the machine readable instructions to direct the electronically controlled robot arm to:
      maneuver the roller to contact the application material in the pool,
      at least partially submerge the roller in the application material,
      maneuver the roller to contact the thinning sheet to distribute the application material to surround the roller, and
      apply the application material to the component by moving the roller across at least a portion of the component.

2. The apparatus of claim 1, wherein the controller circuitry is to direct the electronically controlled robot arm to rotate the roller to a first rotational position when the roller contacts the pool and a second rotational position different from the first rotational position when the roller contacts the thinning sheet.

3. The apparatus of claim 1, wherein the controller circuitry is to direct the electronically controlled robot arm to push the roller on the porous sheet to extract the application material.

4. The apparatus of claim 1, wherein the controller circuitry is to direct the electronically controlled robot arm to maneuver the roller across the porous sheet from the pool to the thinning sheet.

5. The apparatus of claim 1, wherein the controller circuitry is to direct the electronically controlled robot arm to maneuver the roller in a first direction across the pool and a second direction across the thinning sheet, the second direction transverse to the first direction.

6. The apparatus of claim 5, wherein the roller rotates along the pool in the first direction.

7. The apparatus of claim 1, wherein the controller circuitry is to maneuver the roller through a cleaning material.

8. A non-transitory machine readable storage medium comprising instructions to cause programmable circuitry to at least:
   cause an end effector of a robotically controlled arm to contact application material, the application material to adhere to at least a portion of the end effector;
   cause the end effector to at least partially depress a porous sheet to extract the application material from a pool carrying the application material, the porous sheet covering the pool, the application material to flow through the porous sheet;
   direct the robotically controlled arm to maneuver the end effector to roll on a thinning sheet, the thinning sheet enabling the end effector to spread the application material; and
   cause the end effector to contact at least a portion of a workpiece for distribution of the application material thereon.

9. The non-transitory machine readable storage medium of claim 8, wherein the programmable circuitry is to cause the end effector to contact the thinning sheet to distribute the application material to surround an outer surface of the end effector.

10. The non-transitory machine readable storage medium of claim 8, wherein the programmable circuitry is to cause the end effector to at least partially depress the thinning sheet to distribute the application material.

11. The non-transitory machine readable storage medium of claim 8, wherein the programmable circuitry is to cause the end effector to rotate about an axis of rotation, the axis of rotation aligned to a longitudinal axis of the robotically controlled arm.

12. The non-transitory machine readable storage medium of claim 8, wherein the programmable circuitry is to cause the end effector to:
    rotate to a first rotational position when the end effector contacts the pool; and
    rotate to a second rotational position different from the first rotational position when the end effector contacts the thinning sheet.

13. The non-transitory machine readable storage medium of claim 8, wherein the programmable circuitry is to cause the end effector to roll across the porous sheet from the pool to the thinning sheet.

14. The non-transitory machine readable storage medium of claim 8, wherein the programmable circuitry is to cause the end effector to at least partially depress the porous sheet with a force that is power force limiting.

15. A method comprising:
    causing a roller mounted to a robotic arm to contact a pool having application material disposed therein, the roller to retain at least a portion of the application material;
    causing the robotic arm to push the roller on a porous sheet to extract the application material from the pool, the porous sheet covering the pool and the thinning sheet;
    maneuvering the roller from the pool to a thinning sheet;
    maneuvering the roller to contact the thinning sheet to distribute the application material around the roller; and
    causing the robotic arm to maneuver the roller to contact a workpiece, the roller distributing the application material to a portion of the workpiece.

16. The method of claim 15, further including:
    causing the robotic arm to maneuver the roller in a first direction across the pool; and
    causing the robotic arm to maneuver the roller in a second direction across the thinning sheet, the second direction transverse to the first direction.

17. The method of claim 15, further including causing the robotic arm to change a rotational position of the roller after the robotic arm maneuvers the roller away from the pool.

18. The method of claim 15, further including causing the roller to contact the porous sheet when the roller maneuvers from the pool to the thinning sheet.

19. The method of claim 15, further including causing the robotic arm to push the roller on the porous sheet to enable contact between the thinning sheet and the roller.

20. The method of claim 15, wherein the workpiece is an aircraft component.

\* \* \* \* \*